United States Patent [19]
Nagao et al.

[11] Patent Number: 4,865,878
[45] Date of Patent: Sep. 12, 1989

[54] METHOD OF MANUFACTURING VERTICAL MAGNETIZATION TYPE RECORDING MEDIUM

[75] Inventors: Makoto Nagao; Fusao Yamanaka; Akira Nahara, all of Kanagawa, Japan

[73] Assignee: Fuji Photo Film Co., Ltd., Kanagawa, Japan

[21] Appl. No.: 203,840

[22] Filed: Jun. 7, 1988

Related U.S. Application Data

[60] Division of Ser. No. 59,242, Jun. 10, 1987, which is a continuation of Ser. No. 802,150, Nov. 27, 1985, abandoned.

[30] Foreign Application Priority Data

Nov. 29, 1984 [JP] Japan ................................ 59-250415
Dec. 21, 1984 [JP] Japan ................................ 59-268647

[51] Int. Cl.⁴ ............................................ H01F 10/02
[52] U.S. Cl. ........................... 427/131; 204/192.2; 427/132; 427/177; 427/251; 427/255.2; 427/255.5; 427/255.7; 427/296
[58] Field of Search ............... 427/131, 177, 132, 296, 427/130, 129, 251, 255.2, 255.5, 255.7; 428/694, 900, 928; 204/192.2

[56] References Cited

U.S. PATENT DOCUMENTS 4,680,197  7/1987  Sagoi et al. ..................... 427/131

Primary Examiner—Bernard Pianalto
Attorney, Agent, or Firm—Sughrue, Mion, Zinn, Macpeak & Seas

[57] ABSTRACT

In a method of manufacturing a vertical magnetization type recording medium, a soft magnetic film layer is formed on each of the two sides of a non-magnetic support, and then a vertical magnetization film layer is formed on each soft magnetic film layer thus formed, thereby to provide a vertical magnetization type recording medium which has both sides uniform in characteristics and has characteristics making it excellent as a vertical magnetization type recording medium.

16 Claims, 3 Drawing Sheets

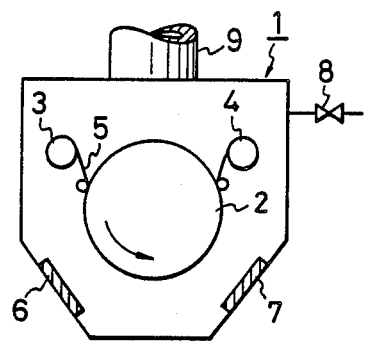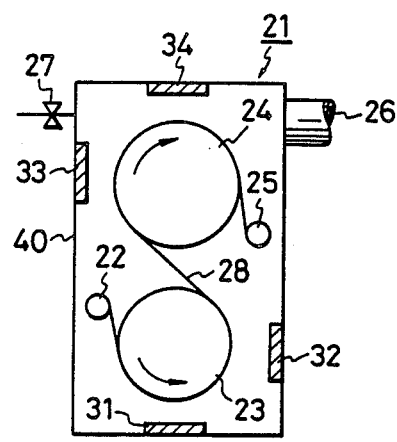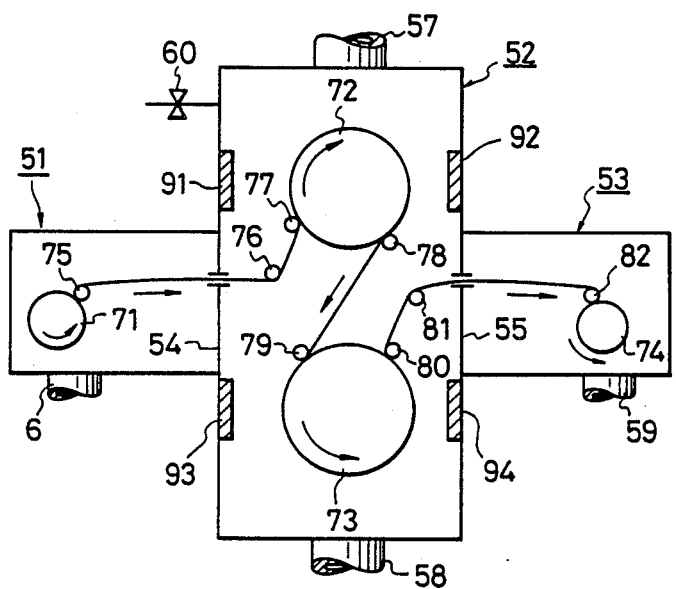

(CAN TEMPERATURE IN FORMING THE Co-Cr FILM LAYERS BY SPUTTERING)

(CAN TEMPERATURE IN FORMING THE PERMALLOY FILM LAYERS BY SPUTTERING)

(ENVELOPE OF RECORDING AND REPRODUCTION WAVE-FORM)

METHOD OF MANUFACTURING VERTICAL MAGNETIZATION TYPE RECORDING MEDIUM

This is a division of application Ser. No. 59,242 filed 6/10/87, which is a continuation of application Ser. No. 802,150 filed 11/27/85 both are now abandoned.

BACKGROUND OF THE INVENTION

The present invention relates to a magnetic recording medium and a manufacturing method therefor. More particularly, the invention relates to a doublesided, two layer vertical magnetization type recording medium and a manufacturing method therefor.

Recently, a vertical magnetization type recording system has been proposed in the art which uses a magnetic recording medium having an "easy" magnetizing axis perpendicular to its surface. In the vertical magnetization recording system, as the recording density increases, the diamagnetic field in the recording medium decreases, and an excellent reproduction output is provided. Thus, the system is fundamentally suitable for high-density recording operations.

In order to perform a magnetic recording operation according to the vertical magnetization type recording system, it is necessary to use a magnetic recording medium having an easy magnetizing axis perpendicular to its film surface. An example of such a vertical magnetization type recording medium can be provided by forming a Co-Cr film layer on a support of a macromolecular material or nonmagnetic material such as a nonmagnetic metal by sputtering or the like.

For the purpose of improving the recording and reproducing efficiency for vertical magnetization type recording and reproducing, a so-called two-film-layer vertical magnetization type recording medium has been proposed in which a high-magnetic-permeability layer of soft magnetic material such as a permalloy (Ni-Fe alloy) film layer is formed, as a base layer, under the vertical magnetization type recording layer such as the aforementioned Co-Cr alloy film layer.

For a flexible disk according to the aforementioned vertical magnetization type recording system, a so-called two-layer vertical magnetization type recording medium, on both sides of which the two-layer vertical magnetization type recording layer is formed, is suitable because it provides a large recording capacity and curling can be readily eliminated.

Heretofore, a sputtering apparatus as shown in FIG. 1 has been used to form the two-layer vertical magnetization type recording layer on the film-shaped support.

In this apparatus, a vacuum chamber 1 is evacuated through a discharge pipe 9. Argon gas is introduced into the vacuum chamber 1 thus evacuated in an amount so that the vacuum chamber 1 is maintained at $5 \times 10^{-3}$ torr. In the vacuum chamber 1 thus treated, a film shaped support 5 is supplied from a support supply roll 3 and is subjected to sputtering while being wound on a cooling can 2.

That is, the film-shaped support 5, supplied from the support supply roll 3, is conveyed via the cooling can 2 to a support take-up roll 4 and is wound on the latter. In this operation, a permalloy target 6 and a Co-Cr target 7 arranged around the cooling can 2 form a double-film layer consisting of a permalloy film layer and a Co-Cr film layer on one side of the support 5.

Thereafter, the pressure in the vacuum chamber is restored to atmospheric pressure, and the film-shaped support is so set in the vacuum chamber that a similar double-film layer is formed on the other side thereof. After the vacuum chamber is evacuated again, a double-film layer is formed on the other side by sputtering in the same manner.

In another proposed method, a double-sided sputtering apparatus as shown in FIG. 2 is used to form the aforementioned double-film layer on each of the two sides of a film-like support in one conveyance. In accordance with this method, a permalloy target 31 and a Co-Cr target 32 form a double-film layer on one side of the film-shaped support, and a permalloy target 33 and a Co-Cr target 34 form a similar film layer on the other side.

More specifically, as shown in FIG. 2, first and second cooling cans 23 and 24 are provided in a vacuum chamber 21. After the vacuum chamber 21 is evacuated through a discharge pipe 28, argon gas is introduced into the vacuum chamber 21 in an amount so as to maintain a pressure of $5 \times 10^{-3}$ torr. Under this condition, a film-shaped support 28 is supplied from a support supply roll 22, wound on the cooling cans 23 and 24, and wound on a take-up roll 25. At the cooling can 23, using the permalloy target 31 and the Co-Cr target 32 provided around it, a double-film layer consisting of a permalloy film layer and a Co-Cr film layer is formed on one side of the film-shaped support 28 by sputtering. In succession, at the cooling can 24, using the permalloy target 33 and the Co-Cr target 34 provided around it, another double film layer is formed on the other side of the support by sputtering.

In the case where a double-sided, two-layer vertical magnetization type recording medium is formed using a take-up type continuous sputtering apparatus as shown in FIG. 1 or 2, tension is, in general, applied in one direction of the film-shaped support. As a result, the static magnetic characteristic of the permalloy film layer becomes anisotropic; that is, the film layer surface becomes anisotropic in magnetic characteristic, and static magnetic characteristics such as magnetic permeability become different in different directions on the support. Therefore, when a recording or reproducing operation is carried out with a floppy disk formed by stamping (cutting) the recording medium, the reproduction output varies in the circumferential direction.

On the other hand, in the case where a doublesided, two-layer vertical magnetization type recording medium having Co-Cr film layers of high coercive force $H_c$ in the vertical direction is formed by a high-speed sputtering method such as a DC magnetron sputtering method, in general, it is preferable that the support be kept at a high temperature while forming the Co-Cr film layers by sputtering.

In a double-sided, two-layer vertical magnetization type recording medium formed using a film shaped support of macromolecular material as described above, when the film-shaped support is heated, it often occurs that the surface characteristic of the film-shaped support is deteriorated, or the two sides of the recording medium have different surface characteristics, vertical orientation, $H_c$ (vertical), etc. As a result, the recording and reproducing characteristics are deteriorated or made variable. This is a serious difficulty preventing the maintenance of desired characteristics of the recording medium during mass production thereof.

Accordingly, there has been a strong demand for provision of a double-sided, two-layer vertical magnetization type recording medium which has two sides of uniform characteristics and which is excellent as a vertical magnetization type recording medium, and also for a manufacturing method for such a recording medium.

SUMMARY OF THE INVENTION

Accordingly, an object of the invention is to eliminate the above-described difficulties accompanying a conventional method of manufacturing a double-sided, two-layer vertical magnetization type recording medium.

More specifically, an object of the invention is to provide a double-sided, two-layer vertical magnetization type recording medium of which both sides have uniform characteristics, which characteristics make the recording medium excellent as a vertical magnetization type recording medium. It is also an object of the invention to provide a manufacturing method for such a recording medium.

Another object of the invention is to provide a double-sided, two-layer vertical magnetization type recording medium in which, when a floppy disk is formed by stamping the recording medium, in a circumferential direction thereof, the reproduction output variations along any given track are extremely small.

The foregoing object and other objects of the invention have been achieved by the provision of a vertical magnetization type recording medium in which a magnetic recording layer consisting of a soft magnetic film layer and a vertical magnetization film layer is formed on each of the two sides of a nonmagnetic support by sputtering or vacuum deposition which is being run, in which, according to the invention, first, a soft magnetic film layer is formed on each of the two sides of the support by sputtering or vacuum deposition, and then a vertical magnetization film layer is formed by sputtering or vacuum deposition on each of the two soft magnetic film layers thus formed.

The foregoing objects and other objects of the invention have further been achieved by the provision of a vertical magnetization type recording medium comprising a film-shaped support on each side of which a soft magnetic film layer and a vertical magnetization film layer essentially containing Co and Cr are formed, in which, according to the invention, the soft magnetic film layer is formed on each side of the support by vacuum deposition or sputtering at a temperature of 30° C. to 90° C.

Further, the invention provides a method for manufacturing a vertical magnetization type recording medium having a film-shaped support on each side of which a soft magnetic film layer and a vertical magnetization film layer essentially containing Co and Cr are formed, in which, according to the invention, the soft magnetic film layers are formed on both sides of the support by soft magnetic film layer forming vacuum deposition sources or sputtering sources arranged around a cylindrical can maintained at a temperature of 30° C. to 90° C., and thereafter the vertical magnetization film layers are formed on the soft magnetic film layers by vertical magnetization film layer forming vacuum deposition sources or sputtering sources arranged around a cylindrical can maintained at a temperature of at least 90° C.

The nature, principle and utility of the invention will become more apparent from the following detailed description when read in conjunction with the accompanying drawings.

BRIEF DESCRIPTION OF THE DRAWINGS

FIGS. 1 and 2 are explanatory diagrams showing examples of conventional methods of manufacturing a vertical magnetization type recording medium;

FIG. 3 is an explanatory diagram showing an example of a method of manufacturing a vertical magnetization type recording medium according to this invention;

DESCRIPTION OF THE PREFERRED EMBODIMENTS

Figure 4:
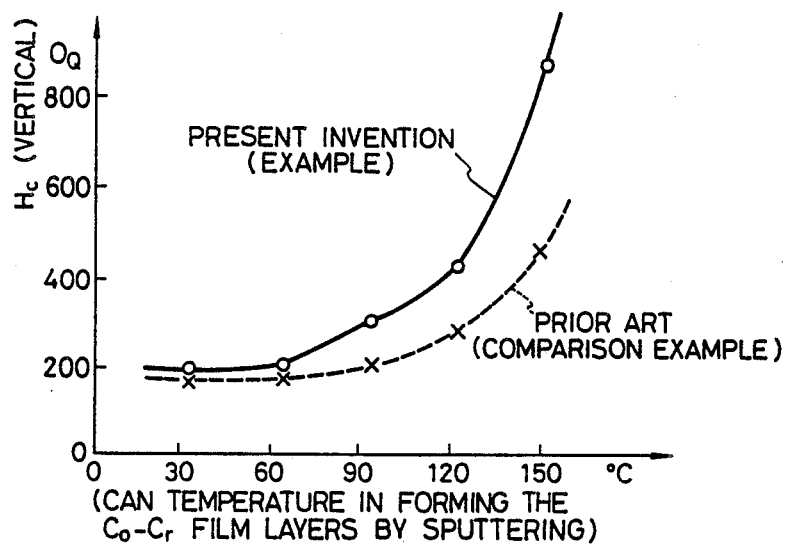
FIG. 4 is a graphical representation indicating the relationships between can temperature and coercive forces ($H_c$) in forming a Co-Cr vertical magnetization film layer by sputtering.

After conducting intensive research to overcome the above-described difficulties accompanying the conventional methods of manufacturing a vertical magnetization type recording medium, it has been found that covering both sides of a film-shaped support with a soft magnetic film layer before formation of a vertical magnetization type film layer such as a Co-Cr film layer thereon, by suppressing discharging of impurity gas from the support of macromolecular material, provides a doublesided, two-layer vertical magnetization type recording medium which has vertical magnetization film layers excellent in vertical magnetization anisotropy and which has two sides uniform in their various characteristics.

In accordance with the invention, a soft magnetic film layer of low coercive force and high magnetic permeability, such as a permalloy film layer, and a vertical magnetization film layer having a magnetizing easy axis perpendicular to the film layer having a magnetizing easy axis perpendicular to the film surface, such as a Co-Cr film layer, are formed on each of the two sides of a nonmagnetic support such as by sputtering, vacuum deposition, or ion plating.

That is, a specific feature of the invention resides in that, before the vertical magnetization film layer such as a Co-Cr film layer is formed, a soft magnetic film layer such as a permalloy film layer is formed on each of the two sides of the film-shaped support by sputtering, vacuum deposition, or the like, to completely cover the surfaces of the film-shaped support with the metal film layer. Therefore, discharging of impurity gases (such as water) contained on the surface or inside the film-shaped support is considerably decreased. Accordingly, when the Co-Cr film layer is formed by sputtering or vacuum deposition, the sputtering or vacuum deposition operation can be performed in a vacuum atmosphere in which the impurity gas components are extremely small, which makes it possible to form vertical magnetization film layers having excellent characteristics on both sides of the support.

In accordance with the invention, a film-shaped support for forming a vertical magnetization type recording medium may be made of a macromolecular material such as polyethyleneterephthalate (PET), polyimide, polyamide, polyphenylensulfide, polythersulfone, or polysulfone. However, the invention is more effective using a material such as PET which deposits oligomer increasingly as its temperature is increased from 90° C. to 200° C. In addition, the invention is applicable to a support having a base layer.

It is preferable that the support be treated in advance, for instance, by holding it in a vacuum chamber, or subjecting it to heat treatment or glow discharge treatment to decrease the discharge of impurity gas from the surface or inside of the support.

The soft magnetic film layer may be made not only of a permalloy material such as Ni-Fe, Ni-Fe-Mo or Ni-Fe-Mo-Cu, but also of "soft" alloys such as Fe, Fe-Al-Si, Fe-Ni-O, Fe-Ti, Ni-Fe-Cn-Cr-Mn, Fe-Si-B, Fe-B-C, Fe-Al, Co-V-Fe, Co-Ta, Co-Zr, Co-Nb-Zr, Co-Ti, Co-Nb-Ta, Co-Ni-Zr, Fe-Ni-P and Fe-Co-Zr.

The film layer thickness should be of the order of 0.03 to 5 microns in order to suppress the deposition of oligomer and the discharge of impurity gas from the film-shaped support, and preferably of the order of 0.1 to 1 micron in order to obtain an excellent vertical magnetization type recording and reproducing characteristic.

It is essential that the easy magnetizing axis of the vertical magnetization film layer be substantially perpendicular to the surface of the support. It is further desirable that the vertical magnetiziation film layer be made of an alloy material essentially containing Co and Cr, which is well known as a vertical magnetization film layer forming material. Alloys having vertical anisotropy, such as Co-V and Co-Ta, may also be used. The film thickness should be of the order of 0.03 to 5 microns, preferably 0.05 to 1 micron.

These film layers may be formed by vacuum deposition or sputtering. However, it is desirable to form the film layers according to a continuous sputtering method in which a plurality of high-speed sputtering sources are provided around a plurality of cylindrical cans. A variety of known high-speed sputtering sources can be employed.

In forming a hard magnetic film layer such as a permalloy film layer, the temperature of the can should be set to at a temperature of 30° C. or higher so that the inside of the hard magnetic film layer cannot become magnetically anisotropic. However, it is desirable that the temperature of the cans not be higher than 90° C. because at an excessively high temperature the discharging of impurity gas or the deposition of oligomer from the support is caused.

In order to minimize the magnetic anisotropy and to improve the flatness of the recording medium's surfaces, it is desirable to set the can temperature to a temperature of 45° C. to 65° C.

In forming the Co-Cr film layer, the can temperature is set to 90° C. or higher in order to obtain a sufficient coercive force $H_c$ (vertical). In order to form a vertical magnetization film layer having a high $H_c$ (vertical), it is preferable that the can temperature be 120° C. or higher.

The double-sided, two-layer vertical magnetization type recording medium according to the invention has a high magnetic permeability layer of hard magnetic substance and the vertical magnetization film layer. However, it may also include a base layer, intermediate layer, and overcoat layer on each side of the support.

The invention will be further described with reference to an example thereof and a comparison example.

EXAMPLE OF THE INVENTION

A double-sided, two-layer vertical magnetization type recording medium was manufactured using a double-sided continuous sputtering apparatus as shown in FIG. 3. As shown in FIG. 3, a roll of PET film 50 microns in thickness was set on a supply shaft 71, and the film was run through intermediate rollers 75 through 82 and cylindrical cans 72 and 73 to a take-up shaft 74 and wound on the latter. The apparatus includes a vacuum chamber divided into a film supplying chamber 51, a sputtering chamber 52, and a film winding chamber 53. A partition board 54 is provided between the chambers 51 and 52, and similarly a partition board 55 is provided between the chambers 52 and 53. These chambers are evacuated by air discharging systems 56 and 57, and 58 and 59.

Sputtering cathodes 91 and 93 of a DC planar magnetron system employing a permalloy target (Ni 78.5 wt%, Fe 21.5 wt%), and sputtering cathodes 92 and 94 of a DC planar magnetron system employing a Co-Cr target (Co 82 wt%, Cr 18 wt%) were provided in the sputtering chamber.

After the sputtering chamber of the apparatus was evacuated to $1\times10^{-6}$ torr, argon gas was introduced into the chamber by a gas introducing system 60 in an amount so that the chamber was maintained at about $3\times10^{-3}$ to $5\times10^{-3}$ torr. The PET film was supplied from the film supply shaft 71 at a rate of 20 mm/min. At the can 72 maintained at a predetermined temperature, a permalloy film layer about 5000 Å A in thickness was formed on one side of the PET film (hereinafter, "surface 0") by the sputtering cathode 91. In succession, at the can 73 maintained at the same temperature, a permalloy film layer about 5000 Å A in thickness was formed on the other side of the film (hereinafter, "surface 1") by the sputtering cathode 93. Then, the film thus treated was wound on the take-up shaft 74. The temperature of the cans was set to 15°, 30°, 60°, 90° and 120° C.

The PET film, both sides of which were covered with the permalloy film layers, was run in the opposite direction from the take-up shaft so that, at the can 73 maintained at a predetermined temperature, a Co-Cr film layer about 2700 Å in thickness was formed on the surface 0 of the PET film by the sputtering cathode 92. The PET film thus treated was wound on the supply shaft 71. The temperature of the cans was set to 30°, 60°, 90°, 120° and 150° C.

For the recording medium so produced, the coercive force $H_c$ (vertical) of the Co-Cr film layer and the half-value width of the (002) peak of Co measured according to the locking curve method were 360 to 390 Oe and 10 to 13 degrees on the surface 0, and 370 to 400 Oe and 10 to 13 degrees on the surface 1.

FIG. 4 shows the relationships between the can temperatures in forming the Co-Cr film layers by sputtering and the $H_c$ (vertical) values of the Co-Cr film layers. The $H_c$ (vertical) values of the Co-Cr film layers depend somewhat on the permalloy film layer forming conditions; however, the graphical representation was determined under the condition that, typically, the permalloy film layer was formed at a can temperature 60° C.

Figure 5:
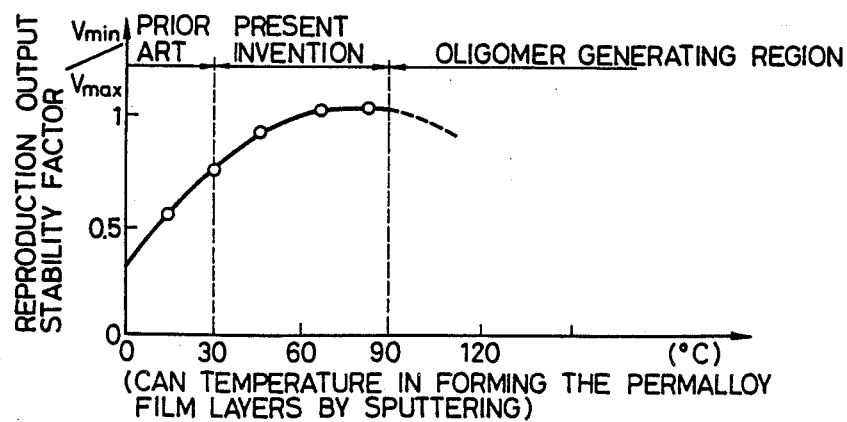
FIG. 5 is a graphical representation indicating the relationships between can temperatures and reproduction output stability factors ($V_{min}/V_{max}$) in forming a hard magnetic film layer by sputtering.

FIG. 5 shows the relationships between the can temperature in forming the permalloy film layers by sputtering and the reproduction output stability factor $V_{max}/V_{min}$ (see FIG. 6) in the circumferential direction in the case where a 5.25 inch floppy disk was formed by stamping a double-sided, two-layer vertical magnetization type recording medium.

Figure 6:
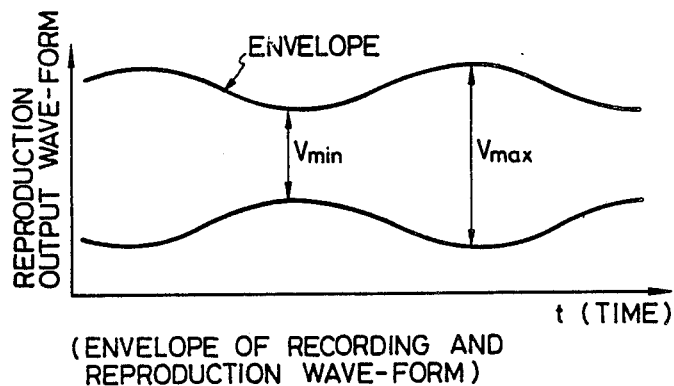
FIG. 6 is a graphical representation indicating the envelope of a reproduced output, in a circumferential direction, from a floppy disk.

FIG. 6 shows the recording and reproducing output envelope of the floppy disk.

COMPARISON EXAMPLE

A comparison experiment was carried out using the same sputtering apparatus.

A roll of PET film 50 microns in thickness was set on the film supply shaft 71 and wound on the take-up shaft in the same manner as in the above-described inventive example. After the sputtering chamber of the apparatus was evacuated to $1\times10^{-6}$ torr or less, argon gas was introduced into the chamber by the gas introducing system 60 in an amount so that the chamber was maintained at $3\times10^{-3}$ torr. The PET film was supplied from the film supply shaft 71 at a rate of 40 mm/min. First, at the can 72 maintained at a predetermined temperature, a permalloy film layer about 5000 Å in thickness and a Co-Cr film layer about 2700 Å in thickness were formed on one side of the PET film by the sputtering cathodes 91 and 92. The PET film thus treated was moved to the can 73, maintained at the same temperature, where a permalloy film layer about 5000 Å in thickness and a Co-Cr film layer about 2700 Å in thickness were formed on the other side of the PET film by the sputtering cathodes 93 and 94. The PET film thus treated was wound on the take-up shaft 74. The temperature of the cans was set to 30°, 60°, 90°, 120° and 150° C.

The coercive force $H_c$ (vertical) of the Co-Cr film layer and the half-value width of the (002) peak of Co measured according to the locking curve method were 240 to 310 Oe and 15 to 19 degrees on the surface 0, and 270 to 340 Oe and 13 to 17 degrees on the surface 1. Thus, the two sides of the film had considerably different characteristics from one another, and the characteristics fluctuated considerably. Only about 10% of the films thus manufactured had satisfactory recording and reproducing characteristics. In the case where a PET film was used instead of the polyimide film, the results were substantially the same.

The $H_c$ (vertical) values of the Co-Cr film layers of the double-sided, two-layer vertical magnetization type recording media thus formed were as indicated in FIG. 4.

As is apparent from FIG. 4, the $H_c$ (vertical) value of the Co-Cr film layer of the double-sided, two-layer vertical magnetization type recording medium according to the invention increases abruptly when the can temperature is 120° C. or higher. This characteristic is desirable for a vertical magnetization type recording medium.

In the vertical magnetization type recording medium manufactured with the can temperature in forming the permalloy film layer by sputtering set to 30° C. or higher, the reproduced output variations were less. Especially in the vertical magnetization type recording medium manufactured with the can temperature in forming the permalloy film layer set to 60° C., reproduced output variations were scarcely detected.

On the other hand, in the vertical magnetization type recording medium manufactured with the can temperature in forming the permalloy film layer by sputtering set to less than 30° C., the reproduction output variation was large and the value $V_{max}/V_{min}$ was considerably low. Thus, the recording medium was not practical.

The surface characteristic of the vertical magnetization type recording medium was substantially undisturbed when the can temperature in forming the permalloy film layer by sputtering was set to 90° C. or lower, and also it was substantially undisturbed when the can temperature in forming the Co-Cr film layer by sputtering was set to 90° C. or higher. However, when the temperature in forming the Co-Cr film layer by sputtering was set to 150°, the surface of the recording medium became slightly gray. Thus, these recording media were found to be satisfactory in practical use.

Thus, in the vertical magnetization type recording medium of the inventive example, compared with that of the comparison example, both sides were uniform in characteristics. Furthermore, substantially no curling was observed. About 80% of the recording media thus manufactured were satisfactory in recording and reproducing characteristics.

On the other hand, in the double-sided, two layer vertical magnetization type recording medium of the comparison example manufactured by forming two film layers on one side of the support and then the same two film layers on the other side by sputtering with the can temperature set to 90° C. or higher, as shown in FIG. 4, the value $H_c$ (vertical) was not significantly increased, even when the can temperature was increased. Furthermore, the recording media thus manufactured were considerably variable in characteristics, and thus were unsatisfactory in recording and reproducing characteristics.

In addition, the surface characteristics of the recording medium of the comparison example were unsatisfactory. Specifically, when the can temperature was set to 90° C. or higher, the surface of the recording medium became significantly gray (this phenomenon was considered as being due to the deposition of oligomer). Thus, that recording medium was unacceptable as a vertical magnetization type recording medium. Furthermore, the crystalline orientation of the Co-Cr film layer was deteriorated, and the two sides of three recording medium were extremely different from each other in recording and reproducing characteristics.

In the above-described inventive example, a two-can, double-sided sputtering apparatus was used. However, the same effects can be obtained using a four-can, double-sided sputtering apparatus wherein two film layers are formed on each side of the support in one conveyance of the latter by forming a permalloy film layer (surface 0), a permalloy film layer (surface 1), a Co-Cr film layer (surface 1 or 0) and a Co-Cr film layer (surface 0 or 1) in the stated order.

In the above-described inventive example, PET film was employed. However, even if a heat-resistant film such as a polyimide film was used, the results were substantially equal to those of the described inventive example or comparison example using the PET film except that the deposition of oligomer was not detected.

Thus, according to the invention, a doublesided, two-layer vertical magnetization type recording medium is provided which has a high value of $H_c$ (vertical), which is isotropic in static magnetic characteristics, which has both sides uniform in characteristics. Moreover, which has excellent electromagnetic conversion characteristics for use as a vertical magnetization type recording medium, and this recording medium can be manufactured with a high efficiency.

We claim:

1. A method for manufacturing a vertical magnetization type recording medium in which a magnetic recording layer consisting of a soft magnetic film layer and a vertical magnetization film layer is formed on each of two sides of a nonmagnetic support by sputtering or vacuum deposition while said support is being run, comprising the steps of:

forming a soft magnetic film layer on each of said two sides of said support by sputtering or vacuum deposition; and then forming a vertical magnetization film layer by sputtering or vacuum deposition on each of the two soft magnetic film layers thus formed.

2. The method as claimed in claim 1 wherein the step of forming said soft magnetic film layers is carried out by sputtering or vacuum deposition using soft magnetic film sources provided around cylindrical cans; and the step of forming said vertical magnetization films is carried out by sputtering or vacuum deposition using vertical magnetization film sources provided around said cylindrical cans.

3. The method as claimed in claim 1, wherein said soft magnetic film layers are formed at a temperature in a range of 30 to 90° C., and said vertical magnetization film layers are formed at a temperature of at least 90° C.

4. The method as claimed in claim 3, wherein said soft magnetic film layers are formed at a temperature in a range of 45 to 65° C.

5. The method as claimed in claim 3, wherein said vertical magnetization film layers are formed at a temperature of at least 120° C.

6. The method as claimed in claim 3, wherein said support is made of a macromolecular material selected from the group consisting of polyethyleneterephthalate, polyimide, polyamide, polyphenylesulfide, polyethersulfone, and polysulfone.

7. The method as claimed in claim 6, further comprising the step of treating said support in advance by a process for decreasing the discharge of impurity gas from said support.

8. The method as claimed in claim 1, wherein said soft magnetic film layers are made of a permalloy material selected from the group consisting of Ni-Fe Ni-Fe-Mo, and Ni-Fe-Mo-Cu.

9. The method as claimed in claim 1, wherein said soft magnetic film layers are made of a soft alloy selected from the group consisting of Fe, Fe-Al-Si, Fe-Ni-O, Fe-Ti, Ni-Fe-Cn-Cr-Mn, Fe-Si-B, Fe-B-C, Fe-Al, Co-V-Fe, Co-Ta, Co-Zr, Co-Nb-Zr, Co-Ti, Co-Nb-Ta, Co-Ni-Zr, Fe-Ni-P and Fe-Co-Zr.

10. The method as claimed in claim 1, wherein a thickness of said soft magnetic film layers is in a range of 0.03 to 5 microns.

11. The method as claimed in claim 1, wherein a thickness of said soft magnetic film layers is in a range of 0.1 to 1 micron.

12. The method as claimed in claim 1, wherein an easy magnetizing axis of said vertical magnetization film layers is oriented perpendicular to a surface of said support.

13. The method as claimed in claim 1, wherein a thickness of said vertical magnetization film layers is in a range of 0.03 to 5 microns.

14. The method as claimed in claim 1, wherein a thickness of said vertical magnetization film layers is in a range of 0.05 to 1 micron.

15. The method as claimed in claim 1, wherein said soft magnetic film layers and said vertical magnetization film layers are formed by high-speed continuous sputtering.

16. The method as claimed in claim 1, further comprising the step of providing said recording medium with a base layer, an intermediate layer, and an overcoat layer on each side of said support.

* * * * *